United States Patent [19]

Nakamura

[11] Patent Number: 5,606,850
[45] Date of Patent: Mar. 4, 1997

[54] OUTDOOR WORKING AUTOMATING SYSTEM

[75] Inventor: Tetsuya Nakamura, Tokyo, Japan

[73] Assignee: Sakura Rubber Co., Ltd., Tokyo, Japan

[21] Appl. No.: 435,497

[22] Filed: May 5, 1995

Related U.S. Application Data

[62] Division of Ser. No. 132,645, Oct. 6, 1993, Pat. No. 5,438,817.

[30] Foreign Application Priority Data

Oct. 9, 1992 [JP] Japan .................................. 4-271836

[51] Int. Cl.$^6$ .................................................. A01D 34/82
[52] U.S. Cl. .................................. 56/10.2 A; 56/DIG. 7; 56/DIG. 15; 111/911
[58] Field of Search ........................... 56/10.2 A, 10.2 R, 56/DIG. 7, DIG. 15; 111/911

[56] References Cited

U.S. PATENT DOCUMENTS 3,924,389 12/1975 Kita ............................. 56/DIG. 15 X
4,545,453 10/1985 Yoshimura et al. ............ 56/DIG. 15 X

FOREIGN PATENT DOCUMENTS

2124798 2/1984 United Kingdom ................ 56/10.2 A

*Primary Examiner*—Terry Lee Melius
*Attorney, Agent, or Firm*—Ladas & Parry

[57] ABSTRACT

An outdoor working automating system includes a rice reaper having a position detecting unit for detecting a position by receiving radio waves from a GPS satellite and a control unit for controlling the position of the rice reaper sa that the position traces predetermined route data, and a rice transplanter having a position detecting unit for detecting a position by receiving radio waves from the GPS satellite and a memory for storing the detected position. The outdoor working automating system causes the memory to store a route that the rice transplanter takes during rice transplanting, and causes the rice reaper to perform rice reaping automatically by using the position data stored in the memory as the route data of the rice reaper.

5 Claims, 6 Drawing Sheets

OUTDOOR WORKING AUTOMATING SYSTEM

This is a divisional of application Ser. No. 08/132,645 filed on Oct. 6, 1993, now U.S. Pat. No. 5,438,817.

BACKGROUND OF THE INVENTION

1. Field of the Invention

The present invention relates to an outdoor working automating system capable of realizing unattended, laborsaving outdoor working in agriculture or forestry.

2. Description of the Related Art

Conventionally, outdoor practices of farm working, such as rice transplanting and rice reaping, have been cumbersome practices for farmers.

A demand has therefore arisen for a system capable of reducing such farm practices.

SUMMARY OF THE INVENTION

It is an object of the present invention to provide an outdoor working automating system capable of realizing unattended, laborsaving outdoor working in agriculture or forestry, thereby reducing outdoor practices in agriculture or forestry.

According to the present invention, there is provided an outdoor working automating system comprising a rice reaper including position detecting means for detecting a current position, and control means for controlling the position of the rice reaper so that the current position detected by the position detecting means traces predetermined route data, a rice transplanter including position detecting means for detecting a current position, and storage means for storing the current position detected by the position detecting means, and means for causing the external storage means to store a route that the rice transplanter takes in rice transplanting, and causing the rice reaper to perform rice reaping automatically by using the position data stored in the storage means as the route data of the rice reaper.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
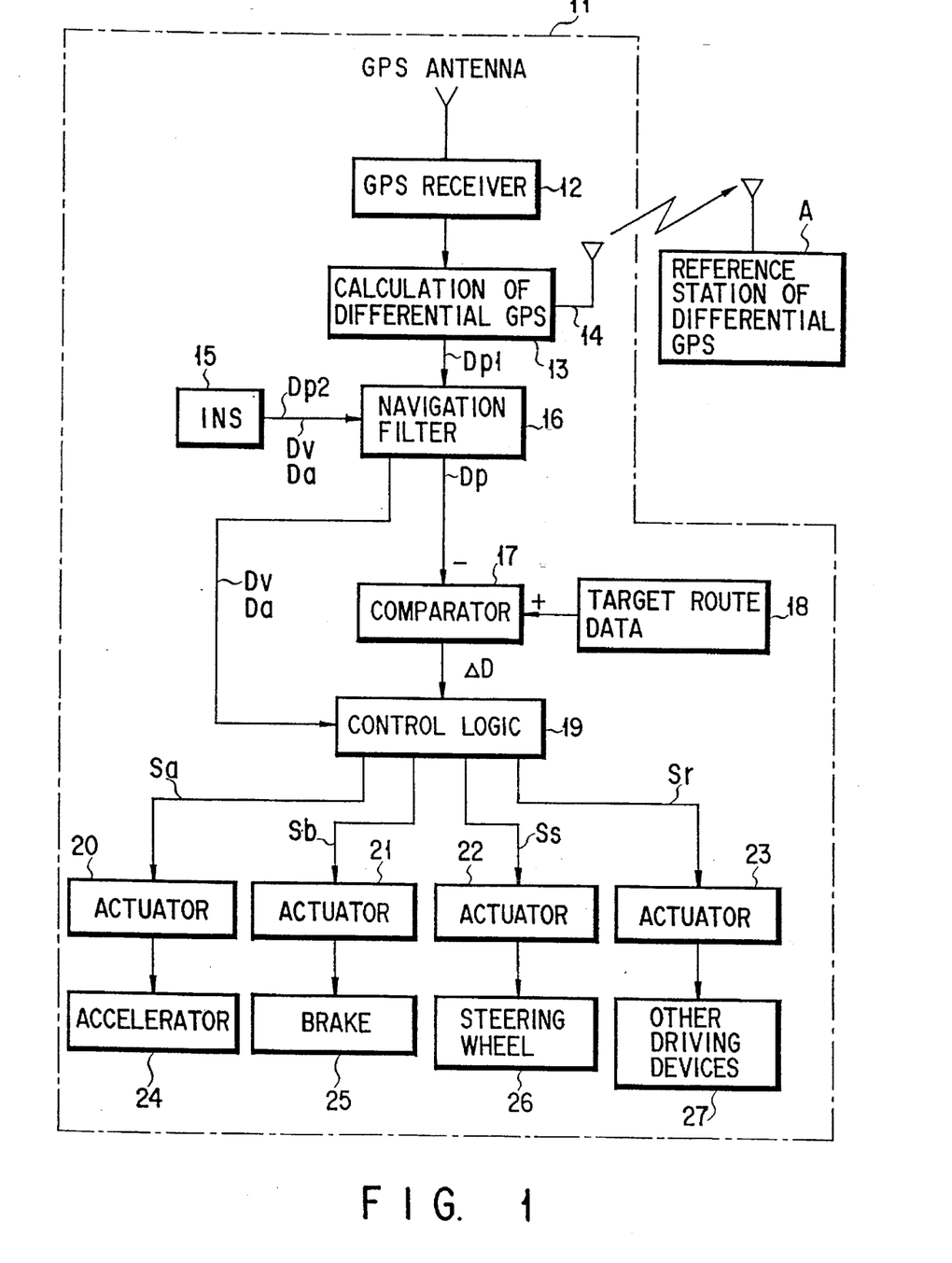
FIG. 1 is a block diagram showing the arrangement of an outdoor working automating system for use in agriculture according to the first embodiment of the present invention.
Figure 2:
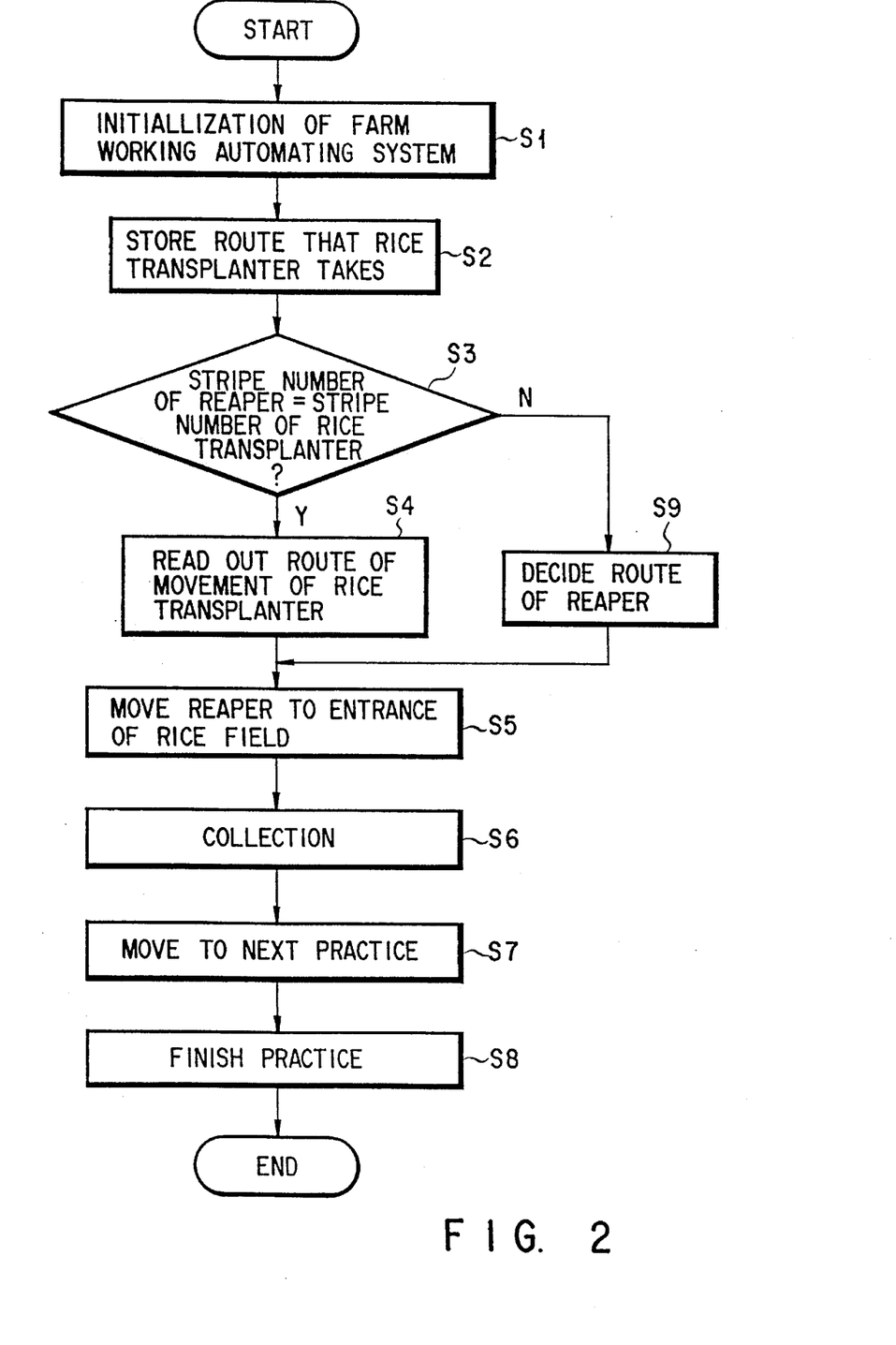
FIG. 2 is a flow chart for explaining the operation of the first embodiment.

A farm working automating system according to the first embodiment of the present invention will be described below with reference to the accompanying drawings. FIG. 1 is a block diagram showing the arrangement of the farm working automating system, and FIG. 2 is a flow chart for explaining the operation of the first embodiment.

Referring to FIG. 1, an alternate long and short dashed line 11 indicates an agricultural implement (e.g., a rice transplanter or a reaper). This agricultural implement has a GPS (Global Positioning System) for receiving microwaves (carrier waves) from a GPS satellite. The microwave received by this GPS antenna is applied to a GPS receiver 12. The GPS receiver 12 has a measuring circuit for measuring the phase of the received microwave.

The phase of the microwave measured by the GPS receiver 12 is applied to a differential GPS arithmetic unit 13. This differential GPS arithmetic unit 13 is connected to an antenna 14 for exchanging data with respect to a reference station (to be described later).

The differential GPS arithmetic unit 13 receives the phase of the microwave supplied from the GPS receiver 12 and the phase of the microwave detected by the reference station and received by the antenna 14. The differential GPS arithmetic unit 13 calculates the phase difference between the microwaves received by the reference station A and the GPS antenna of the agricultural implement 11, obtaining position data Dp1 (the latitude, the longitude, and the altitude) of the agricultural implement 11.

Reference numeral 15 denotes an INS (Inertial Navigation System). This INS 15 is a device mounted on aircrafts and the like to measure a velocity, a position, and an attitude. The position data Dp1 calculated by the differential GPS arithmetic unit 13 and position data Dp2, velocity data Dr, and attitude data Da of the agricultural implement measured by the INS 15 are applied to a navigation filter 16.

The navigation filter 16 is constituted by, e.g., a Kalman filter. The two input position data Dp1 and Dp2 are converted into strict position data Dp through the navigation filter 16. That is, this position data Dp is used as the position data of the agricultural implement.

The output position data Dp from the navigation filter 16 is applied to the (−) terminal of a comparator 17. The (+) terminal of the comparator 17 receives route data Mp indicating a target route from a storage unit 18 for storing the route data.

The comparator 17 compares the position data Dp of the agricultural implement 11 with the route data Mp and outputs a difference signal ΔD to a control logic 19.

The velocity data Dv and the attitude data Da output via the navigation filter 16 are also applied to the control logic 19. The control logic 19 computes an optimum control form on the basis of the input position data Dp, velocity data Dr, and attitude data Da, and outputs an accelerator control signal Sa, a brake control signal Sb, a steering control signal Ss, and other control signals Sr to actuators 20 to 23.

The actuators 20 to 23 apply signals to an accelerator 24, a brake 25, a steering wheel 26, and other driving devices 27 of the agricultural implement 11.

The operation of the first embodiment of the present invention with the above arrangement will be described below. As an example of agricultural automation, processing for automating rice reaping will be described with reference to the flow chart shown in FIG. 2. First, the farm working automating system is initialized (step S1). That is, the reference station A of the differential GPS performs processing for measuring an accurate position of the reference station A (step S1). Subsequently, processing for storing the route that a rice transplanter takes during rice transplanting is performed (step S2). More specifically, the rice transplanter is moved to a rice field in which reaping is to be automated. The rice transplanter is kept unmoved at the entrance of the rice field for several minutes, and the position of the rice transplanter is measured with a precision of about 1 cm by means of interference measurement of the differential GPS and recorded. The rice transplanter is then moved one meter, and its position is measured precisely. The current position thus obtained accurately is set as an initial value of the INS 15. Since the INS 15 also requires an initial value of the attitude data of the machine, the current position data is compared with the data measured first before the rice transplanter is moved one meter, thereby calculating the direction the rice transplanter points. When the initial setting is finished, a worker rides in the rice transplanter and starts rice transplanting. On the basis of the position data measured by the INS 15, the route that the rice transplanter takes is recorded at appropriate intervals and stored in an external storage device, such as a floppy disk. During the rice transplanting, the rice transplanter is stopped at given intervals to measure its precise position by means of the interference measurement of the differential GPS, thereby correcting the drift of the INS 15.

Processing for performing reaping by using a reaper will be described below. First, whether the stripe number of the reaper equals that of the rice transplanter is checked (step S3). If it is determined in step S3 that the stripe number of the reaper equals that of the rice transplanter, the floppy disk used in step S2 is inserted into a floppy disk unit of the rice reaper. The route that the rice transplanter took, which is stored in this floppy disk, is transferred to the storage unit 18 shown in FIG. 1.

The rice reaper is moved to the entrance of the rice field (step S5). In this case, the rice reaper can be moved without being attended because the position of the entrance of the rice field and the route to the entrance are also stored in the floppy disk.

The rice reaper is then moved according to the route indicated by the data stored in the storage unit 18, starting rice reaping. At this point, the route that the reaper is to trace is given as discrete points, so a proper interpolating method is used to obtain a continuous route.

Rice reaping is performed in this manner, and then collection is performed (step S6). In this case, the reaper itself may store rice in it if it is a large-size reaper, or may be so programmed as to move rice automatically to a collecting place when a proper amount of rice is stored in it. That is, when an appropriate amount of reaped rice is stored, the rice is placed on the rice field, and the position where the rice is placed is measured precisely so that an unmanned transporter can pick it up later. Since the location where the reaped rice is placed can be detected accurately, collection can be performed reliably and efficiently.

When rice reaping in one rice field is finished in this manner, the flow advances to the next practice (step S7). That is, the reaper moves for rice reaping in another rice field.

If there is no any other practice, the processing is finished.

If NO is determined in step S3, i.e., if it is determined in step S3 that the stripe number of the reaper differs from that of the rice transplanter, a working route of the reaper is formed. That is, the range within which rice is transplanted is determined from the data of the working route stored in the floppy disk during rice transplanting, and the reaping route is set by using a rule (an algorithm obtained by stipulating the know-how of farmers) for setting a procedure of reaping (step S9).

Thereafter, the processing from step S5 is similarly performed.

If there is no central control facility, the rice reaping automating processing is performed as described above.

Figure 3:
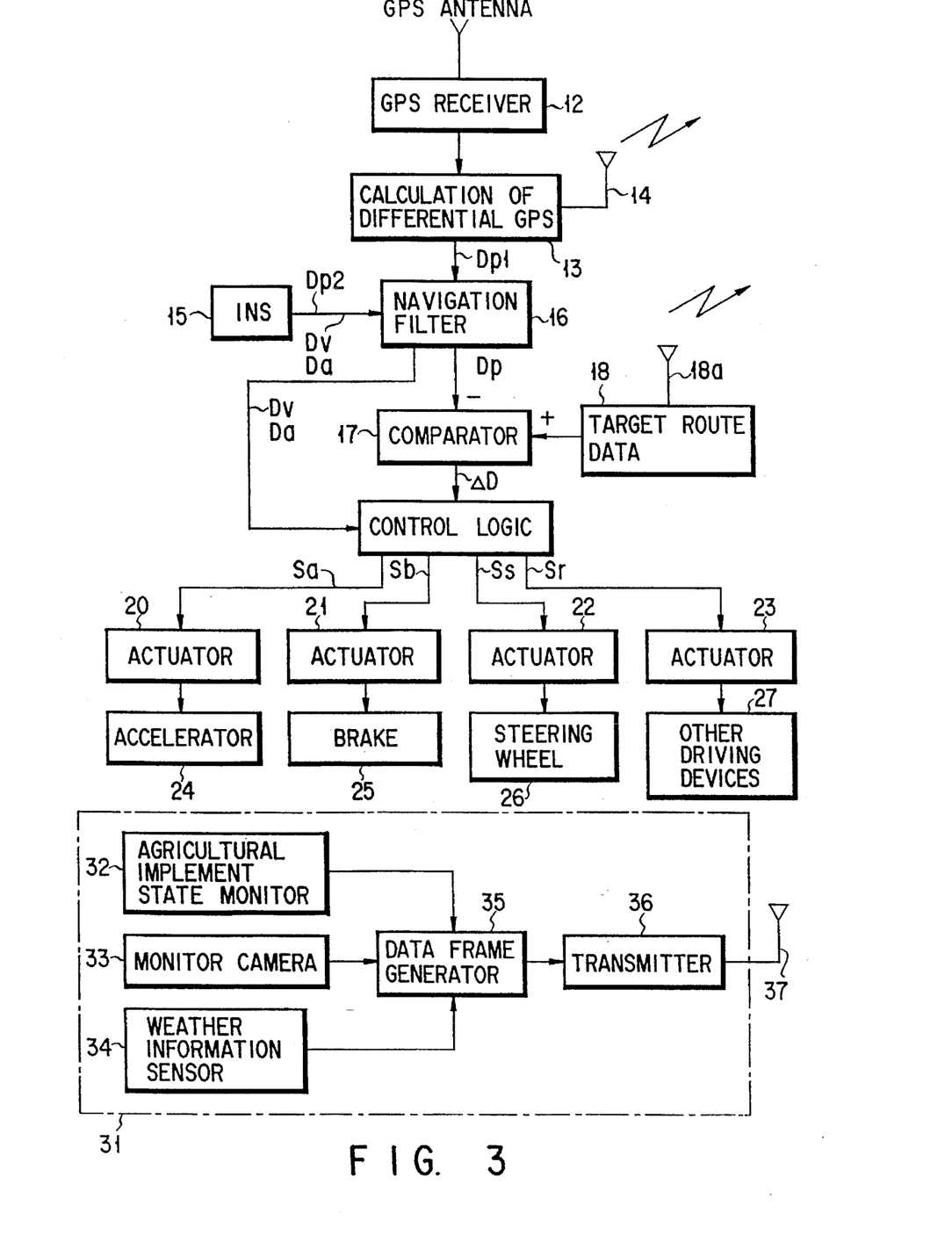
FIG. 3 is a block diagram showing the arrangement of an outdoor working automating system with a central control facility according to the second embodiment of the present invention.
Figure 4:
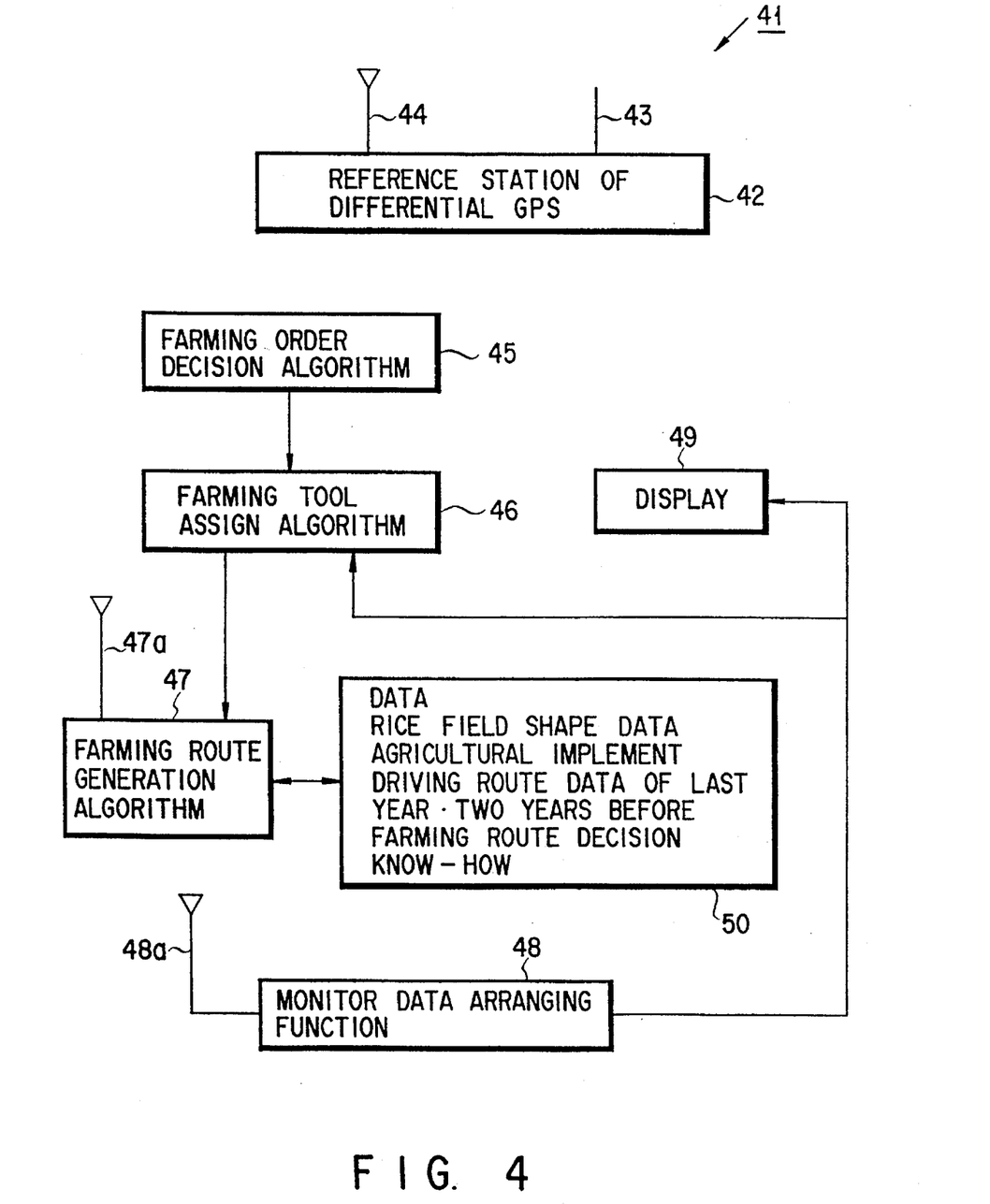
FIG. 4 is a block diagram showing the details of the central control facility.
Figure 5:
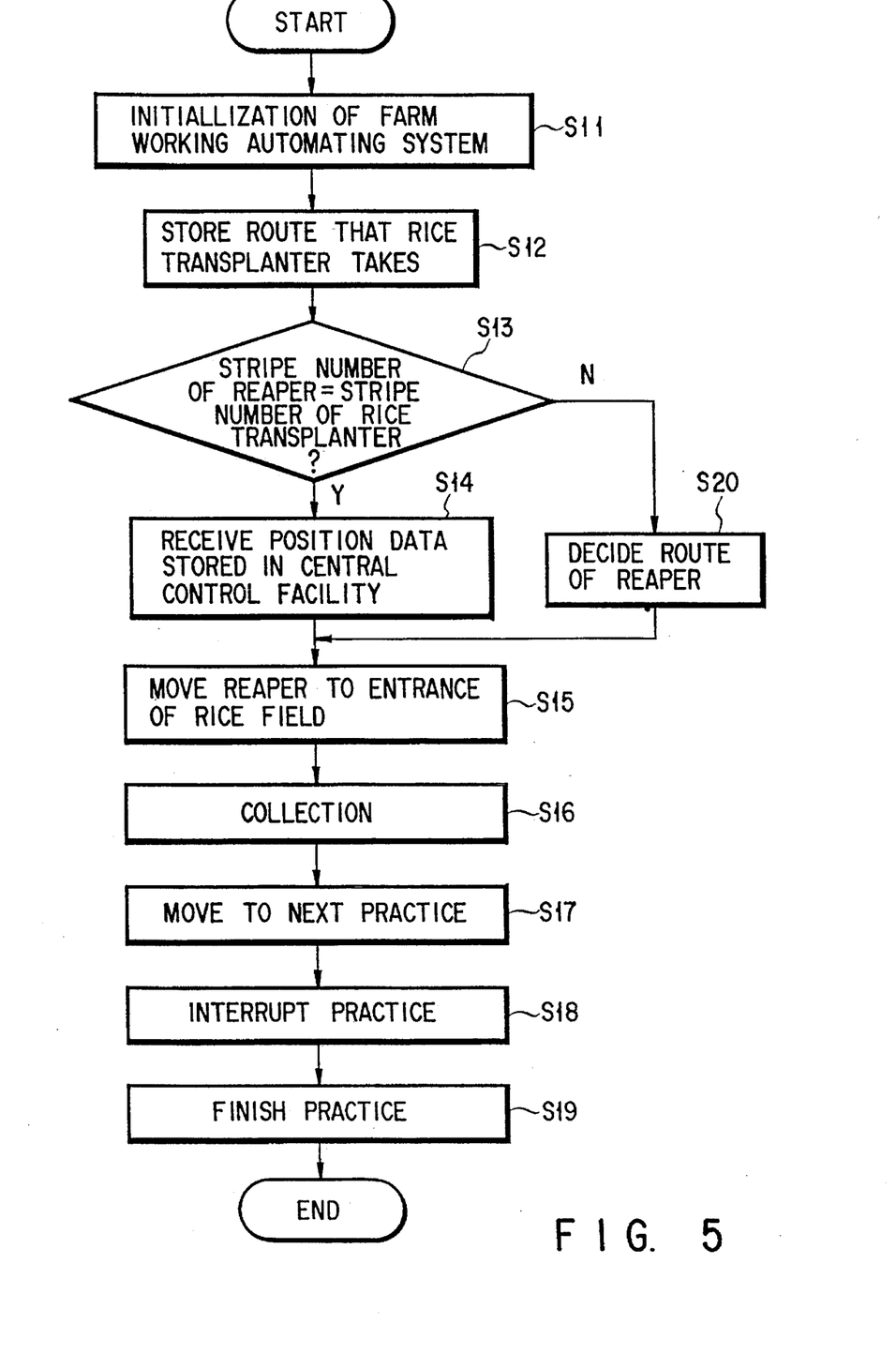
FIG. 5 is a flow chart for explaining the operation of the second embodiment of the present invention.

An outdoor working automating system with a central control facility according to the second embodiment of the present invention will be described below with reference to FIGS. 3 to 5. This embodiment will be explained by taking automatic rice reaping as an example. FIG. 3 is a block diagram showing the arrangement of an agricultural implement when there is a central control facility. The same reference numerals as in FIG. 1 denote the same parts in FIG. 3, and a detailed description thereof will be omitted. Route data stored in a storage unit 18 can be transmitted from an antenna 18a to an antenna 47a of the central control facility.

Referring to FIG. 3, reference numeral 31 denotes a monitor unit. This monitor unit 31 comprises an agricultural implement state monitor 32 for monitoring the remaining fuel amount, the failure, the water temperature, and the oil temperature of the agricultural implement, a monitor camera 33 which is, e.g., an infrared camera for photographing an image surrounding the agricultural implement, and a weather information sensor 34 for detecting weather information. The outputs from the agricultural implement state monitor 32, the monitor camera 33, and the weather information sensor 34 are applied to a data frame generator 35. The data frame generator 35 generates a data frame on the basis of the remaining fuel amount, the failure, the water temperature, and the oil temperature of the agricultural implement output from the agricultural implement state monitor 32, the image surrounding the agricultural implement photographed by the monitor camera 33, and the output weather information from the weather information sensor 34, and outputs the data frame to a transmitter 36.

The transmitter 36 is connected to an antenna 37. The data frame is transmitted from the antenna 37 to an antenna 48a of the central control facility to be described below.

The detailed arrangement of the central control facility will be described below with reference to FIG. 4. Referring to FIG. 4, reference numeral 41 denotes a reference station of a differential GPS. The reference station 41 is connected to a GPS antenna 43 and an antenna 44 for exchanging data with respect to an agricultural implement 11. The central control facility controls the entire farm working automating system and comprises a microcomputer and its peripheral circuits. This microcomputer has functions given in blocks generally denoted by reference numeral 41. That is, the microcomputer has a farming order decision algorithm 45, a farming tool assign algorithm 46, a farming route generation algorithm 47, and a monitor data arranging function 48. The farming order decision algorithm 45 decides an order of, e.g., transplanting or reaping. The farming tool assign algorithm 46 determines a rice field to which a given farming tool is to be assigned on the basis of the order of transplanting, reaping, or the like decided by the farming order decision algorithm 45. The farming route generation algorithm 47 generates a farming route on the basis of the data indicating a rice field to which a given farming tool is to be assigned, which is determined by the farming tool assign algorithm 46, and rice field data, agricultural implement driving route data of the last year or two years before, and farming route decision know-how, all of which are stored in a storage means 50. The monitor data arranging function 48 receives the outputs transmitted from the agricultural implement state monitor 32, the monitor camera 33, and the weather information sensor 34 of the monitor unit 31, and arranges the monitor data. The monitor data is supplied to the farming tool assign algorithm 46 and a display 49.

The operation of the second embodiment of the present invention with the above arrangement will be described below. As an example of agricultural automation, processing for automating rice reaping will be described with reference to the flow chart shown in FIG. 5. First, the farm working automating system is initialized (step S11). That is, reference station 42 of the differential GPS performs processing for measuring an accurate position of the reference station 42 (step S11). The start position of the agricultural implement is then stored accurately. Subsequently, processing for storing the route that a rice transplanter takes during rice transplanting is performed (step S12). More specifically, the rice transplanter is moved to a rice field in which reaping is to be automated. The rice transplanter is kept unmoved at the entrance of the rice field for several minutes, and the position of the rice transplanter is measured with a precision of about 1 cm by means of interference measurement of the differential GPS and recorded. The rice transplanter is then moved one meter, and its position is measured precisely. The current position thus obtained accurately is set as an initial value of an INS 15. Since the INS 15 also requires an initial value of the attitude data of the machine, the current position data is compared with the data measured first before the rice transplanter is moved one meter, thereby calculating the direction the rice transplanter points. When the initial setting is finished, a worker rides in the rice transplanter and starts rice transplanting. On the basis of the position data measured by the INS 15, the route that the rice transplanter takes is recorded at appropriate intervals and stored in an external storage device, such as a floppy disk, or transmitted to the central control facility 41. During the rice transplanting, the rice transplanter is stopped at given intervals to measure its precise position by means of the interference measurement of the differential GPS, thereby correcting the drift of the INS 15.

Processing for performing reaping by using a reaper will be described below. First, whether the stripe number of the reaper equals that of the rice transplanter is checked (step S13). If it is determined in step S3 that the stripe number of the reaper equals that of the rice transplanter, the route that the rice transplanter took, which is transmitted from the central control facility 41, is received and transferred to the storage unit 18 shown in FIG. 1.

The rice reaper is moved to the entrance of the rice field (step S15). In this case, the rice reaper can be moved without being attended because the position of the entrance of the rice field and the route to the entrance are also stored in the floppy disk.

The rice reaper is then moved according to the route indicated by the data stored in the storage unit 18, starting rice reaping. At this point, the route that the reaper is to trace is given as discrete points, so a proper interpolating method is used to obtain a continuous route.

Rice reaping is performed in this manner, and then collection is performed (step S16). In this case, the reaper itself may store rice in it if it is a large-size reaper, or may be so programmed as to move rice automatically to a collecting place when a proper amount of rice is stored in it.

When rice reaping in one rice field is finished in this manner, the flow advances to the next practice (step S17). That is, the reaper moves for rice reaping in another rice field.

During execution of the above practice, the following processing is performed by interrupting the practice (step S18). That is, the reaper transmits the surrounding conditions (weather and image data) and the states (the states of a fuel and a lubricating oil, and various failure monitor data) of the machine to the central control facility 41 while performing the practice. On the basis of these data (the weather conditions or the monitor data of the machine) and the image (obstacle), the practice is interrupted automatically or in accordance with the judgment of an operator for the purpose of refueling, repair, or the like. For example, refueling can be executed automatically by accurately measuring the position of an oil station beforehand and giving the reaper the route data indicating the route to the oil station. After the refueling, the reaper is returned to the farm practice. If there is not any other practice, the processing is finished (step S19).

If NO is determined in step S13, i.e., if it is determined in step S13 that the stripe number of the reaper differs from that of the rice transplanter, a working route of the reaper is formed. That is, the range within which rice is transplanted is determined from the data of the working route stored in the floppy disk during rice transplanting, and the reaping route is set by using a rule (an algorithm obtained by stipulating the know-how of farmers) for setting a procedure of reaping (step S20).

Thereafter, the processing from step 15 is similarly performed.

As described above, rice reaping can be automated when the central control facility is present.

Figure 6:
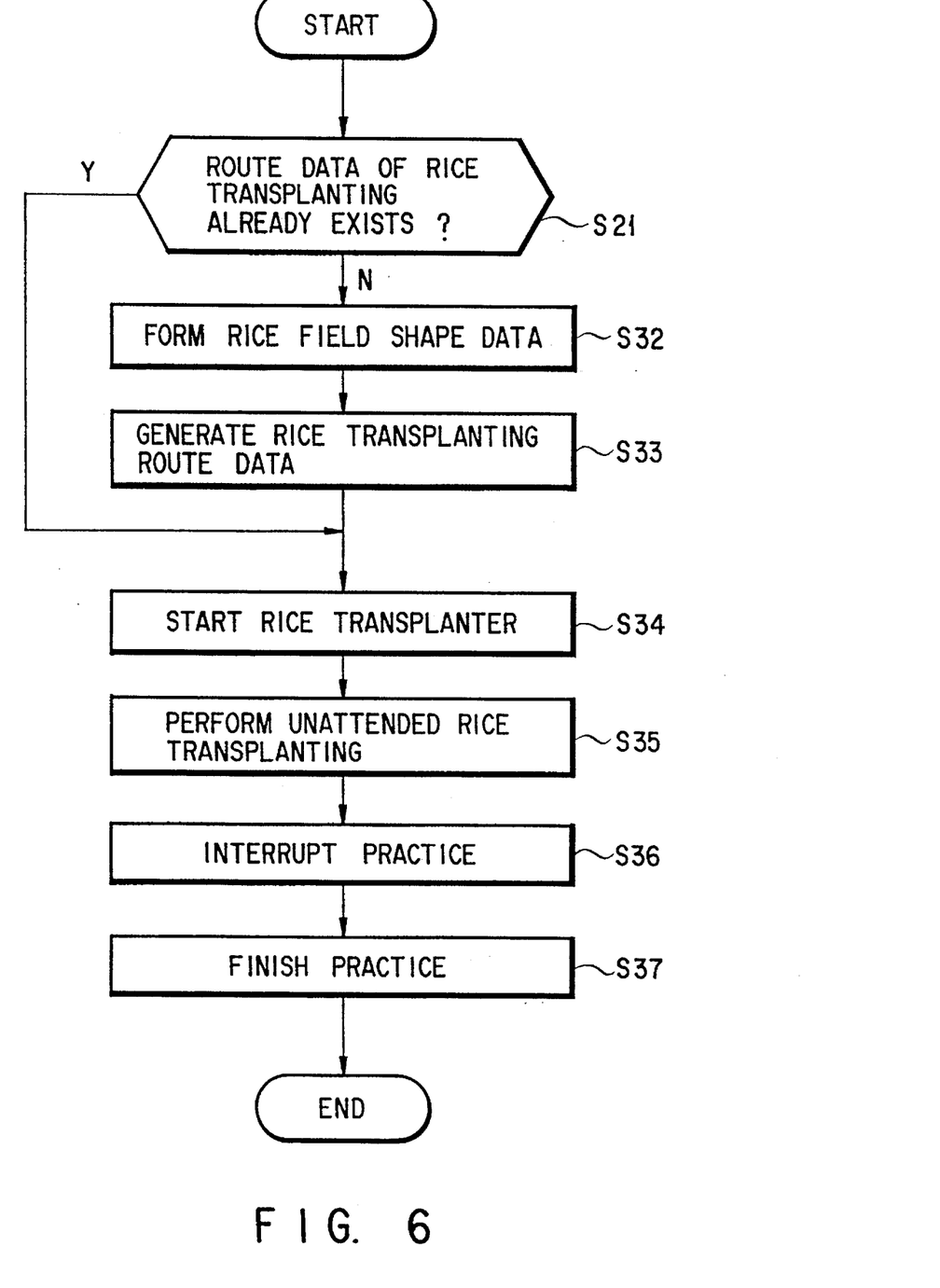
FIG. 6 is a flow chart for explaining the operation of the third embodiment of the present invention.

The third embodiment of the present invention will be described below with reference to FIG. 6. This third embodiment relates to an automating system designed to automate rice transplanting. The block diagrams of this rice transplanting automating system are identical with those shown in FIGS. 3 and 4, so a detailed description thereof will be omitted.

The operation of the rice transplanting automating system will be described with reference to FIG. 6. First, whether route data of rice transplanting in the last year already exists is checked (S21). If NO is determined in step S21, i.e., if it is determined in step S21 that there is no route data of the last year, rice field shape data is formed (step S32). That is, since it is assumed in this third embodiment that a central control facility 41 is present, a relative position with respect to a reference station 42 is measured by a differential GPS. More specifically, a position measuring apparatus (a composite apparatus of the differential GPS and an INS) is moved to a rice field to be measured. The position measuring apparatus is kept unmoved at the entrance of the rice field for several minutes, and the position of the apparatus is measured with a precision of about 1 cm by means of interference measurement of the differential GPS and recorded. The position measuring apparatus is then moved one meter, and its position is measured precisely. The current position thus obtained accurately is set as an initial value of an INS. Since the INS also requires an initial value of the attitude data of the machine, the current position data is compared with the data measured first before the position measuring apparatus is moved one meter, thereby calculating the direction the position measuring apparatus points. When the initial setting is finished, the position measuring apparatus is moved, for example, around the rice field in one circle to start measuring the rice field. On the basis of the position data measured by the INS, the route that the position measuring apparatus takes is recorded at appropriate intervals and transmitted to the central control facility. During the measurement, the position measuring apparatus is stopped at given intervals to measure its precise position by means of the interference measurement of the differential GPS, thereby correcting the drift of the INS. If the shape of the rice field (plowed field) is not rectangular, the shape is approximated to a polygon.

If there is no central control facility 41, the shape of the rice field (plowed field) is measured by using an appropriate metering instrument, such as a GPS receiver. Also in this case, the measurement is performed by using the position measuring apparatus combining the differential GPS and the INS, and the measurement data is recorded in an external storage unit, such as a floppy disk, incorporated in the position measuring apparatus.

Subsequently, rice transplanting route data is generated (step S33). That is, since the shape of the rice field (plowed field) is already determined, the rice transplanting route data (a position data row to be transmitted as a command to the rice transplanter) is generated by applying an appropriate rule.

The flow then advances to step S34 and the subsequent steps to perform rice transplanting. First, the rice transplanter is started (step S34). That is, the rice transplanter set as described above is so moved as to start rice transplanting. If rice transplanting is to be performed by controlling rice transplanters in a plurality of rice fields by the central control facility 41, the central control facility 41 determines a rice field to which a given rice transplanter is assigned, and designates each rice transplanter.

Unattended rice transplanting is then performed (step S35). That is, the rice transplanter is operated to perform rice transplanting along the rice transplanting route in the last year or the newly generated rice transplanting route in accordance with the data transmitted from the central control facility 41. At this point, the rice transplanting route data (command) is given as discrete values. If, therefore, continuous route data is necessary, the discrete route data is converted into continuous route data by using a proper interpolating method.

Subsequently, the practice is interrupted (step S36). In this case, monitoring of the states (the remaining fuel amount, the oil temperature, and the failure) of the rice transplanter and monitoring of the weather conditions are the same as those explained in the second embodiment. Therefore, the practices are interrupted and restored at appropriate timings on the basis of these data.

When the rice transplanting is finished, the processing of the central control facility 41 is also ended (step S37).

Although automation of rice transplanting has been described above, the above system is also applicable to rice reaping using a rice reaper, or plowing or puddling and reveling using a tractor.

Note that weeding can also be automated by storing positions at which rice is transplanted during rice transplanting and weeding plants at positions where no rice is transplanted.

Furthermore, in forestry, the positions of individual trees may be stored by using a GPS receiver during tree planting, thereby mowing plants at positions where no trees are planted by using an unmanned mower. In this case, it is also possible to automatically trim adjacent trees by moving a robot for moving a trimming robot on the basis of the tree position data already stored.

In the above embodiments, the reference station is provided to measure the position by using the differential GPS. However, the position may be measured by using a regular GPS navigation method without providing any reference station. Furthermore, the navigation method is not limited to the GPS navigation but may be another satellite navigation.

The present invention can be applied to reaping of crops, such as wheat, as well as rice reaping.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automated system for weeding between rice transplanted to selected positions, said system comprising means for storing information relating to said selected positions of said transplanted rice, an automated unmanned weeder means for performing weeding operations, and control means responsive to said means for storing information related to said selected positions for moving said weeding means to positions exclusive of the stored positions for performing weeding operations avoiding the rice.

2. An automated system for the performance of mowing operations, said system comprising detecting means for detecting the positions of trees and storing the positions of the trees during a tree planting operation, an automated unmanned mower means for performing mowing operations, and control means for moving said mower means to positions exclusive of the tree positions for performing mowing operations within a boundary of the tree planting operation.

3. An outdoor automated system, said system comprising position detecting means for detecting and storing tree-planted positions resulting from a tree planting operation, and a robot means for performing mowing operations, said robot means being controlled by said detecting means for being moved to positions except for the tree-planted positions to perform the mowing operation within a boundary of the tree planting operation.

4. A method of operating an automated unmanned weeder within a rice planting operation, said method comprising transplanting rice plants to determinable positions, storing information relating to said determined positions, and controlling said automated unmanned weeder in accordance with said stored information to perform weeding operations between said plants.

5. A method for performing a mowing operation with a remote controlled mower, said method comprising detecting tree positions and storing the positions thereof, and remotely controlling the remote controlled mower to perform a mowing operation between the trees in accordance with the stored positions.

* * * * *